May 3, 1966 H. W. TEMPLETON 3,248,955
PRESSURE RELIEF BOOT SEAL
Filed June 29, 1962 2 Sheets-Sheet 1
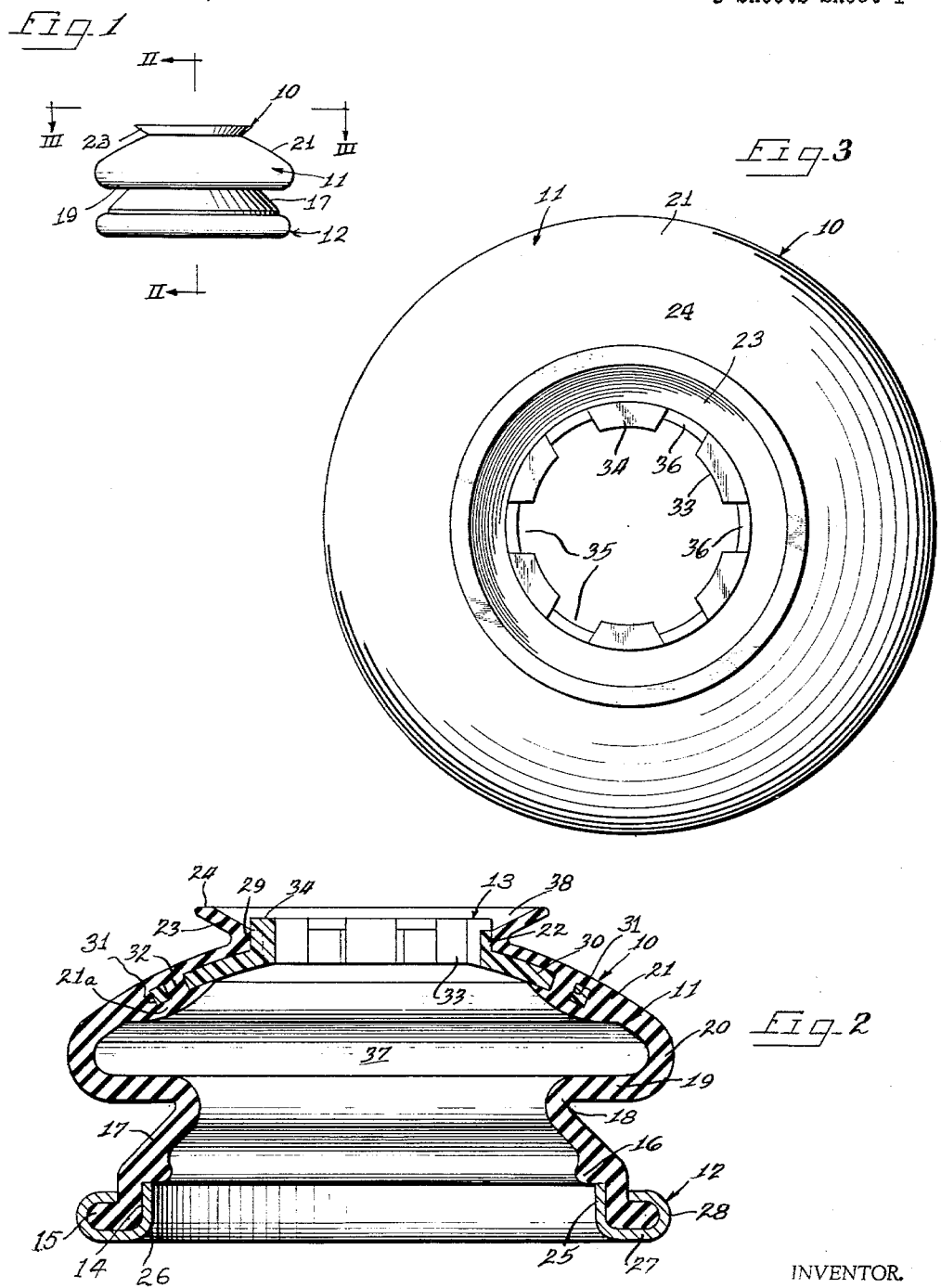
INVENTOR.
Herbert W. Templeton
BY
ATTORNEYS May 3, 1966  H. W. TEMPLETON  3,248,955
PRESSURE RELIEF BOOT SEAL
Filed June 29, 1962  2 Sheets-Sheet 2
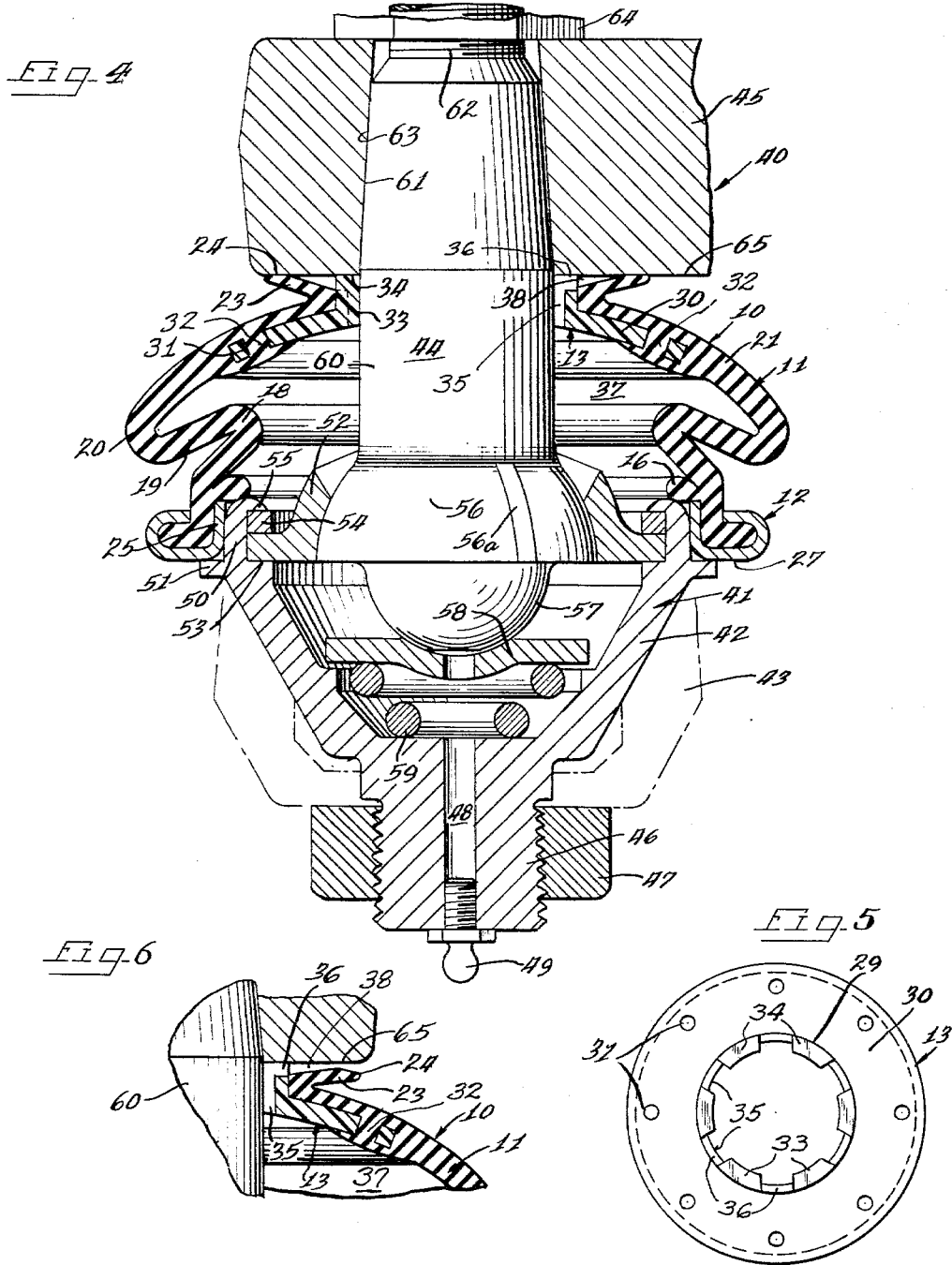
INVENTOR.
Herbert W. Templeton
BY
Hill, Sherman, Meroni, Gross & Simpson
ATTORNEYS

United States Patent Office 3,248,955
Patented May 3, 1966

3,248,955
PRESSURE RELIEF BOOT SEAL
Herbert W. Templeton, Southfield, Mich., assignor to TRW Inc., a corporation of Ohio
Filed June 29, 1962, Ser. No. 206,214
1 Claim. (Cl. 74—18.1)

This invention relates to a boot type seal, especially adapted for ball and socket type joints, although useful in any installation for sealing relatively tiltable members while automatically venting or relieving excess pressures such as might be developed by high pressure lubrication or by the accumulation of excessive amounts of lubricant. Specifically this invention relates to a sealing boot for tie rod and wheel suspension ball joints of automotive vehicles which does not interfere with the free relative rotation and tilting of the joint studs and sockets and which will prevent ingress of dirt and moisture while accommodating release of grease overloads.

While the invention will hereinafter be specifically described as embodied in a boot seal for a wheel suspension ball joint, it will of course be appreciated that the scope of the invention is not limited to such usage and that the boot seals of this invention have general utility for sealing articulate members while selectively venting excessive pressures from the zones adjacent the members.

The boot seal of this invention includes a molded flexible body, preferably composed of an oil resistant rubber such as neoprene or a similar plastic material having inherent resiliency tending to reclaim its original molded shape although accommodating deformation from said shape without appreciable resistance. The body has a large open end encased in a rigid ring, preferably composed of metal such as zinc or cadmium plated steel. The opposite end of the body has a smaller diameter opening therethrough in which is disposed a collar member preferably composed of a self-lubricating plastic material such as nylon or Teflon. This collar has a skirt molded directly into the body material and a grooved end face surrounded by a flexible lip of the body. The metal ring is sized to encompass and seat upon the end of the ball joint socket from which the ball stud projects and an internal lip or bead on the body adjacent the ring sealingly engages the socket. The collar receives the shank of the ball stud therethrough in radial bearing relation and the end face of the collar is in axial thrust bearing relation with the member to which the ball stud is connected. The body surrounds the shank of the ball stud in spaced relation and provides a chamber between the socket and the member connected to the stud.

The distance between the socket and the member connected to the stud is less than the free state height of the body so that in operation the body is axially collapsed. To accommodate this collapse the body is molded with a bellows-like convolution and due to the resilience of the body material an axial thrust force is maintained to hold the collar in its thrust bearing contact against the member to which the stud is connected and to flatten the lip portion so that the periphery of the lip snugly and sealingly engages the face of the member to which the stud is connected. The grooves in the collar vent the chamber encompassed by the body to the lip area. The lip is quite flexible and will deflect away from the face of the member to which the stud is connected under the influence of internal pressure thereby venting the chamber to the atmosphere. However, in the absence of excessive internal pressures in the chamber, the lip will maintain good sealing engagement with the member connected to the stud and will prevent ingress of any foreign matter into the chamber.

It is then an object of this invention to provide a boot type seal with a pressure relief vent surrounded by a sealing lip adapted to deflect and open the vent under excessive loads.

A further object of this invention is to provide a pressure relief boot seal with a valve which will only open under excessive internal pressures in the boot.

A still further object of this invention is to provide a boot seal with a pressure relief lip normally maintaining sealing contact with an opposed member but adapted to be deflected to relieve excess grease or the like from the chamber enclosed by the boot.

A specific object of the invention is to provide a boot seal for ball and socket type joints with a sealing bead deformed into tight sealing engagement with the socket and a sealing lip deformed into light sealing engagement with a member receiving the stud of the joint.

Another and specific object of this invention is to provide a synthetic resilient rubber-like boot with sealing lips at opposite ends thereof which are deformable into sealing engagement with respective parts of an assembly on which the boot is mounted.

A still further and more specific object of the invention is to provide a boot seal with a rigid collar member molded into a resilient body member and providing a radial and a thrust bearing.

Other and further objects of this invention will be apparent to those skilled in this art from the following detailed description of the annexed sheets of drawings which, by way of a preferred example only, illustrate one embodiment of this invention.

On the drawings:

FIGURE 1 is a side elevational view of the boot seal of this invention.

FIGURE 2 is a vertical cross sectional view taken along the line II—II of FIG. 1 and illustrating the boot seal on a larger scale.

FIGURE 3 is a plan view taken along the line III—III of FIG. 1 and also on a larger scale.

FIGURE 4 is a vertical cross sectional view, with parts in elevation, of a wheel suspension ball joint assembly equipped with a boot seal of this invention.

FIGURE 5 is a plan view of the collar for the boot seal.

FIGURE 6 is a fragmentary cross sectional view, with a part in elevation, illustrating the manner in which excess pressures are relieved from the interior of the boot seal.

As shown on the drawings:

In FIGS. 1 to 4 the reference numeral 10 designates generally a boot seal of this invention composed of an oil resistant synthetic rubber tubular body 11, a metal ring 12 on one end of the body and a plastic collar 13 in the other end thereof and preferably composed of self-lubricating plastic material such as "nylon" or "Teflon."

The body 11 is molded to the free state shape illustrated in FIGS. 1 and 2 and has a large diameter open end with a cylindrical inner wall 14 and a surrounding external bead 15. An internal bead or lip 16 projects inwardly from the cylindrical wall 14 and forms a deformable sealing ring as will be more fully hereinafter explained. The body 11 converges inwardly from the internal bead area 16 along a generally conical path 17 to a U-shaped corner portion 18. The body then extends radially outward along a wall portion 19 to a large diameter U-shaped bellows-like bulge 20. From the bulge 20 the body 11 converges radially inward and axially upward along a wall 21 terminating in a small diameter opening defined by a cylindrical wall 22. From the cylindrical wall 22 the body 11 converges radially outward and axially upward to provide an outturned annular lip 23 which is somewhat thinner and more flexible than the main body 11. This lip has a flat end face 24 for a purpose to be more fully described.

The metal ring 12 has an internal cylindrical skirt 25 lining the cylindrical wall 14 of the body and terminating at the bottom of the bead 16. From this cylindrical skirt 25 the ring flares outwardly at a rounded corner portion 26 to a flat radial flange 27 underlying the large open end of the body and the bottom end of the bead 15. A U-shaped crimped portion 28 extends from the flange 27 around the bead 15 to clamp the ring 12 to the body.

The collar 13 has a cylindrical portion 29 lining the cylindrical wall 22 at the small open end of the body 11 and an integral arcuate skirt 30 extending outwardly from the cylindrical portion 29 and embedded in the wall 21 of the body 11. This skirt as best shown in FIG. 5 has circumferentially spaced holes 31 therethrough adjacent the outer periphery thereof to receive the rubber body material therethrough for forming columns or plugs 32 which securely anchor the skirt in the body material. As best shown in FIG. 2 the body wall 21 is somewhat thickened at 21a to fully encompass the skirt 30. The collar 13 is thus integrally vulcanized to the rubber-like material of the body 11.

The cylindrical portion 29 of the collar 13 has an inner periphery 33 forming a radial bearing and a flat end face 34 forming an axial bearing. The inner peripheral wall 33 has a plurality of axially extending grooves 35 extending from the top to the bottom thereof and intersecting radial grooves 36 in the end face 34. These grooves 35 and 36 provide passageways joining the main boot chamber 37 with a small annular chamber 38 inside of the lip 23 and surrounding the cylindrical portion 29 of the collar.

In operation, as shown in FIG. 4, the boot seal 10 is somewhat collapsed from its free state height in a ball joint wheel suspension assembly 40 including a ball joint 41 with the socket portion 42 thereof seated in the end of a wheel arm 43 and the ball stud portion 44 thereof wedge locked in the wheel knuckle 45. In such an assembly the socket 42 has a depending threaded stud 46 with a locking nut 47 thereon securing the assembly to the wheel arm 42. The stud 46 has a lubricant bore 48 therethrough and a lubricant fitting 49 on the end thereof. The socket 42 has a cylindrical open end portion 50 with a radial flange or shoulder 51 projecting outwardly therefrom. A dome-shaped cover or bearing ring 52 is seated in the cylindrical end 50 of the socket and is locked therein between an internal socket shoulder 53 and a washer 54. The open end of the socket is spun over the top of the washer 54 at 55. The bearing ring 52 provides an internal fragmental spherical bearing wall on which the head 56 of the stud can tilt. The stud head has a rounded depending button 57 seated in a retainer washer 58 which is spring pressed thereagainst by a coil spring 59. The stud head 56 is thus held in bearing engagement with the bearing ring 52.

The stud 44 has a cylindrical shank 60 extending from the head 55 to a conical portion 61 which converges to a threaded cylindrical end 62. The conical portion 61 is seated in a conical bore 63 of the wheel knuckle 45 and is wedge locked therein by a nut 64 threaded on the end 62. The bottom face 65 of the wheel knuckle member 45 is generally flat and provides a radial shoulder surrounding the cylindrical shank portion 60 of the stud.

The boot seal 10 has the metal ring 12 thereof sized so that the inner skirt 25 will snugly embrace the cylindrical wall 50 while the radial flange 27 will bottom on the shoulder flange 51. The bead or lip 16 of the boot overlies the cylindrical wall 50 of the socket and is deformed into sealing contact with the socket portion 55 when the ring 12 is bottomed on the shoulder 51. The lip 16 thus cooperates with the ring 12 to sealingly connect the boot with the socket.

The collar 13 receives the stud shank therethrough and the inner peripheral cylindrical wall 33 of the collar embraces the cylindrical portion 60 of the stud in bearing relation. The end face 34 of the collar engages the flat bottom face 65 of the knuckle 45. The lip end rim 24 also engages this face 65 and the lip 23 is somewhat flattened to bring the end faces 24 and 34 into alignment.

Since the axial distance between the socket shoulder 51 and the knuckle face 65 is less than the free state height of the boot seal, the boot in its operating condition is partially axially collapsed in the same manner as a bellows. This collapsing is accommodated by flexing of the corner portion 18 and bulge portion 20 so that the wall 19 which normally extends radially outward will be sloped downwardly as shown in FIG. 4. The rigid skirt 30 of the collar 13 however holds the wall portion 21 in the same shape existing in the free state of the boot.

Since the body 11 is resilient it will tend to reclaim its free state height and therefore the axial bearing face provided by the end wall 34 of the collar will be urged against the face 65 of the knuckle 45. In addition since the end face 24 of the lip 23 normally projects beyond this bearing face 34 of the collar, the inherent flexibility of the lip will hold the portion 24 against the face 65 except when internal pressures in the annular chamber 38 inside of the lip exceed the deflection resistance of the lip whereupon, as shown in FIG. 6, the lip 23 will deflect to unseat the end face 24 from the face 65 and vent the chamber 38.

The main chamber 37 is continually vented to the chamber 38 through the passages provided by the axial grooves 35 and the radial grooves 36 in the collar 13.

Thus when excessive amounts of grease or other lubricant are introduced through the fitting 49 into the socket 42 and flow from the socket as for example through the lubricant grooves 56a in the stud head 56 into the boot chamber 37, the excess grease can be released through the passages under the control of the flexible lip. As soon as the excess grease is discharged the lip will spring back to its sealing position.

The Teflon or nylon collar 13 provides low friction radial and axial bearing surfaces which do not interfere with the free rotation of the stud relative to the socket. The flexibility of the body 11 of course readily accommodates free tilting of the stud in its socket.

From the above descriptions it will therefore be understood that this invention provides an efficient boot seal with sealing lips at both ends thereof and with one of the lips acting as a relief valve to vent excess pressures from the boot.

I claim as my invention:

A boot seal comprising:

a generally tubular resilient body of bellows shape to accommodate axial collapse and having two ends, a rigid collar embedded in one end of the tubular body providing radial and thrust bearing surfaces for one end of the seal, said collar having passages through said radial and thrust bearing surfaces thereof with the passages in the radial surfaces each extending from a passage in in the thrust bearing surface through to the other end of the collar and opening on the interior of the tubular body, an annular deformable outwardly flared lip integral with the tubular body surrounding and intersecting the collar below the thrust bearing surface thereof substantially in alignment with the bottoms of the passages in said thrust bearing surface and extending radially and axially outwardly at an angle from the collar axially beyond the thrust bearing surface thereof and terminating in a flat end face parallel with the thrust bearing surface of the collar to provide an interference check valve fit with the surface of a member seated against the thrust bearing surface, and said lip being flexible relative to the tubular body to unseat the flat end face thereof from the member seated against the thrust bearing face of the collar to vent the interior of the tubular body upon development of excessive pressures therein, but otherwise seating against said member and preventing ingress to the interior of the body.

References Cited by the Examiner

UNITED STATES PATENTS

| | | |
|---|---|---|
| 1,815,771 | 7/1931 | Grant. |
| 2,050,702 | 8/1936 | Jackson _____ 74—18.2 X |
| 2,124,034 | 7/1938 | Hufferd. |
| 2,559,857 | 7/1951 | Edwards. |
| 2,707,645 | 5/1955 | Moskovitz. |
| 2,957,713 | 10/1960 | Herbenar. |
| 3,021,157 | 2/1962 | Moskovitz. |
| 3,052,477 | 9/1962 | Parker. |
| 3,135,539 | 6/1964 | Ulderup et al. _____ 287—87 |
| 3,175,834 | 3/1965 | Wallace et al. _____ 287—87 X |

FOREIGN PATENTS 925,328    4/1955   Germany.

CARL W. TOMLIN, *Primary Examiner.*

A. V. KUNDRAT, *Assistant Examiner.*